United States Patent [19]
Herbenar

[11] 3,968,975
[45] July 13, 1976

[54] JOINT ASSEMBLY

[75] Inventor: Edward J. Herbenar, Detroit, Mich.

[73] Assignee: TRW Inc., Cleveland, Ohio

[22] Filed: June 9, 1975

[21] Appl. No.: 585,252

[52] U.S. Cl. .............................. 280/95 R; 403/114; 403/129
[51] Int. Cl.² ......................................... F16C 11/06
[58] Field of Search ....................... 280/95 R, 95 A; 403/114, 115, 116, 128, 129, 130, 131, 133, 138, 137, 113, 135, 144, 125

[56] References Cited
UNITED STATES PATENTS

| | | | |
|---|---|---|---|
| 1,918,520 | 7/1933 | Chilton | 280/95 R |
| 1,967,288 | 7/1934 | Cathcart | 280/95 R |
| 2,779,603 | 1/1957 | McRae | 280/95 R |
| 3,028,172 | 4/1962 | Herbenar | 280/95 R |
| 3,337,232 | 8/1967 | Peickii et al. | 280/95 R |
| 3,521,900 | 7/1970 | Sakai | 403/128 X |
| 3,679,236 | 7/1972 | Warshawsky | 403/138 X |
| 3,902,816 | 9/1975 | Moore | 403/114 |

Primary Examiner—Robert R. Song
Assistant Examiner—Jack D. Rubenstein

[57] ABSTRACT

An improved ball and socket joint assembly is effective to apply force to a steering system tending to return it to a straight ahead condition upon actuation of the steering system. The ball and socket assembly includes a rotatable ball which is disposed in a socket chamber. The ball is rotatably supported by a pair of seat members which engage opposite sides of the ball. A rod element extends through the center of the ball. A pair of sleeve members are urged into engagement with opposite end portions of the rod by biasing springs. Upon actuation of the steering system, the ball is rotated and the rod moves the sleeve members against the influence of the biasing springs. The force exerted on the end portions of the rod by the sleeve members applies a torque to the ball urging it back to its initial position.

18 Claims, 6 Drawing Figures

JOINT ASSEMBLY

BACKGROUND OF THE INVENTION

The present invention relates to a new and improved joint assembly and more specifically to a ball and socket type joint assembly which is advantageously utilized in a vehicle steering system.

Known vehicle steering systems commonly include a plurality of links which are interconnected by ball and socket type joints. When the vehicle is to be turned, a pitman arm is moved to actuate the linkage and effect turning movement of steerable wheels under the influence of forces transmitted through the ball and socket joints. Upon interruption of the steering action, the wheels are returned to a straight ahead condition under the influence of the various known forces which are due to many different factors, including kingpin inclination and caster. In some cases these forces may not be enough to return the steerable wheels all the way to the straight ahead position.

One known arrangement for supplementing the forces tending to return a vehicle steering linkage to the straight ahead position is disclosed in U.S. Pat. No. 1,918,520. The arrangement disclosed in this patent includes a cam which is connected with a pitman arm and is disposed between a pair of seat elements. One of the seat elements is fixedly connected with a drag link. The other seat element is pressed against the cam by a biasing spring. Upon actuation of the pitman arm, the cam is rotated and shifts the movable seat against the influence of the biasing spring. As the movable seat is shifted, the center of the pitman arm is moved relative to the drag link. Of course, this results in a variation in the effective overall length of the drag link with a resulting change in the geometry of the steering linkage. Other known systems for supplementing the forces tending to return a steering linkage to a straight ahead condition are disclosed in U.S. Pat. No. 1,967,288.

SUMMARY OF THE PRESENT INVENTION

The present invention relates to a new and improved ball and socket assembly which is advantageously utilized in a vehicle steering system to promote a returning of the steering system to a straight ahead condition upon interruption of a steering operation. The assembly includes a ball which is rotated in a socket chamber upon actuation of the steering system. In order to maintain the effecting length of the various links in the steering system substantially constant upon actuation of the steering system, ball seat members support the ball for rotation about a center which is maintained in a predetermined position in the socket chamber. As the ball is rotated during a steering operation, a biasing assembly is effective to apply a force to the ball tending to rotate the ball back to its initial position to thereby apply a force to the steering system tending to urge it toward a straight ahead condition.

The biasing assembly may include a rod which extends through the ball and is engaged by a pair of force transmitting members which are pressed against opposite ends of the rod by springs. Upon rotation of the ball, the opposite ends of the rod move the force transmitting members apart to thereby compress the springs. The compressed springs press the force transmitting members against opposite ends of the rod to apply a torque to the ball which tends to rotate the ball back to its initial position. The compact construction of the ball and socket assembly is promoted by mounting the force transmitting members and springs in a coaxial relationship with each other and the ball seat members.

Accordingly, it is an object of this invention to provide a new and improved ball and socket assembly which interconnects parts of a vehicle steering system and applies a force to the steering system tending to return it to a straight ahead condition upon actuation of the steering system and wherein the ball and socket assembly includes a ball which is rotated about a predetermined center upon actuation of the steering system and is urged back to its initial position under the influence of a biasing arrangement upon interruption of a steering operation.

Another object of the invention is to provide a new and improved apparatus which includes a ball which is retained in a socket chamber by a pair of seat members and is rotated upon actuation of a steering system and wherein a biasing assembly is effective to apply a force to the ball to rotate the ball back to its initial position upon interruption of a steering operation and wherein the biasing assembly includes a pair of force transmitting members which are disposed in the socket chamber and are pressed against surfaces connected with the ball by a pair of springs to urge the ball back to an initial position upon interruption of the steering operation.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
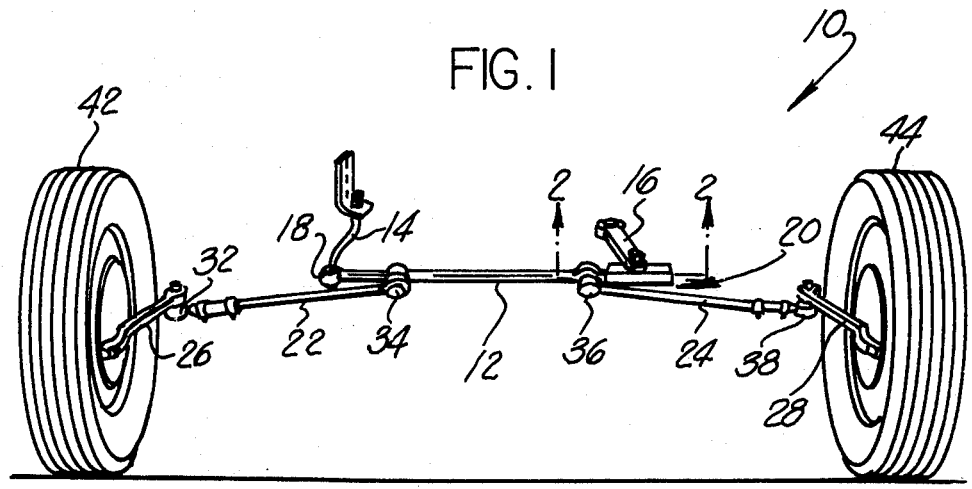
FIG. 1 is a schematic illustration of a steering system having a ball and socket joint assembly construction in accordance with the present invention.

A steering linkage 10 utilized in a steering system constructed in accordance with the present invention is illustrated in FIG. 1 and includes a center link 12 which is connected with an idler arm 14 and a pitman arm 16 by ball and socket joints 18 and 20. A pair of tie rods 22 and 24 are connected with the center link 12 and with wheel brackets 26 and 28 by ball and socket joints 32, 34, 36 and 38. Upon movement of the pitman arm 16 in response to a turning of a steering wheel of the vehicle, the steering linkage 10 effects movement of steerable vehicle wheels 42 and 44 from the straight ahead condition illustrated in FIG. 1 to a turning condition. Since the general construction of this steering linkage 10 and the manner in which it cooperates with the vehicle wheels 42 and 44 is well known, it will not be further described herein in order to avoid prolixity of description.

In accordance with a feature of the present invention, the ball joint 20 is constructed so as to provide a force which tends to urge the vehicle wheels 42 and 44 to their straight ahead positions upon interruption of a steering action. The ball joint 20 includes a spherical ball member 50 which is disposed in a socket chamber 52 formed in a housing 54 connected with the center link 12. A stud element 56 (see FIG. 3) extends through an opening 57 formed in a tubular socket wall 58 (see FIG. 2) of the housing 54 and is connected with the pitman arm 16.

Upon initiation of a steering action, movement of the pitman arm 16 is transmitted through the ball joint 20 to the center link 12. Forces transmitted between the pitman arm 16 and the center link 12 through the ball joint 20 cause the stud 56 and ball 50 to rotate relative to the socket wall from the initial or straight ahead position shown in FIG. 2 to the actuated or turning position shown in FIG. 4. Upon interruption of the steering operation, the ball 50 is rotated from the actuated position of FIG. 4 back to the initial position of FIG. 2 under the influence of forces transmitted through the steering linkage 10 and under the influence of a biasing assembly 62.

In order to maintain the effective length of the pitman arm 16 and center link 12 substantially constant upon actuation of the steering system, the ball 50 is supported for rotation about its center by a pair of ball seats 66 and 68 which engage diametrically opposite portions of the ball. The ball seats 66 and 68 are fixedly mounted in a coaxial relationship with the cylindrical socket chamber 52 and have circular concave end surfaces 70 and 72 of the same radius of curvature as the spherical outer surface 74 of the ball 50. The circular concave end surfaces 70 and 72 of the seat members 66 and 68 are disposed on cylindrical body sections 78 and 80 which are integrally formed with circular base portions 82 and 84. The ball seats 66 and 68 are disposed in a coaxial relationship and have a common central axis which extends through the center of the ball 50. The ball seats 66 and 68 are held against the ball 50 by an externally threaded end portion 88 of the center link 12 and an externally threaded plug 90 which are received within the internally threaded cylindrical socket wall 58.

Figure 6:
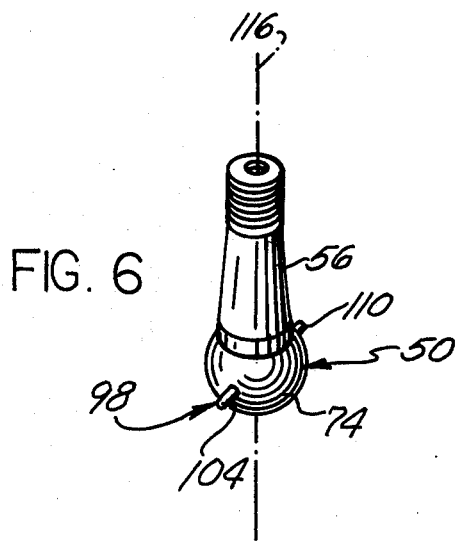
FIG. 6 is a pictorial illustration further illustrating the construction of the ball.

The biasing assembly 62 is disposed in a coaxial relationship with the ball seats 66 and 68 and includes a pair of sleeve members 94 and 96. The sleeve members 94 and 96 are effective to apply force to opposite end portions of a cylindrical rod 98 extending through the center of the ball 50 upon rotation of the ball from the initial position of FIG. 2 to the actuated position of FIG. 4. The sleeve 94 has an annular head end surface 102 which is pressed against an end portion 104 of the rod 98 by a helical coil biasing spring 106 when the ball 50 is in the actuated position of FIG. 4. Similarly, an annular head end surface 108 of the sleeve 96 is pressed against the opposite end 110 of the rod 98 by a helical coil biasing spring 112. Upon interruption of a steering action, the forces against the opposite end portions 104 and 110 of the rod 98 apply a torque to the ball 50 tending to rotate it about a central axis 116 (see FIG. 6) of the shank 56. This torque urges the ball 50 from the actuated position of FIG. 4 back toward the initial position of FIG. 2 which corresponds to a straight ahead condition for the steering linkage 10.

The compact construction of the ball and socket assembly 20 is promoted by the fact that the ball seats 66 and 68 and biasing assembly 62 are disposed in a coaxial relationship along an axis which intersects the center of the ball 50 and the shank axis 116 about which the ball 50 rotates upon actuation of the steering linkage 10. Thus, the helical coil biasing springs 106 and 112 are telescopically disposed about the cylindrical bodies 78 and 80 of the ball seats 66 and 68 in coaxial relationship therewith. The biasing springs 106 and 112 are received within cylindrical chambers 120 and 122 defined by cylindrical walls 124 and 126 of the sleeve members 94 and 96. The coaxial walls 124 and 126 of the sleeve members 94 and 96 are disposed in sliding engagement with the cylindrical inner surface of the socket wall 58 to guide movement of the sleeves 94 and 96 between the initial position of FIG. 2 and the actuated position of FIG. 4. It should be noted that when the sleeves 94 and 96 are in the initial position of FIG. 2, concave inner surfaces 128 and 130 on the annular head ends of the sleeves 94 and 96 are disposed in abutting engagement with the spherical outer surface 74 of the ball 50 and the annular head end surfaces 102 and 108 of the sleeves 94 and 96 are pressed firmly against the outer surface of the rod 98 to hold the rod in the initial position illustrated in FIG. 2.

When the ball and socket joint 20 is to be assembled, the ball 50 is inserted into the socket chamber 52 through the opening 57. As the ball 50 is moved through an enlarged end portion 138 of the opening 57, one of the outwardly projecting ends of the rod 98 moves into engagement with the wall of the tubular housing. The ball is then rocked sideways and moved into the socket chamber with the shank 56 extending through a relatively narrow slot portion 140 of the opening 57.

Figure 2:
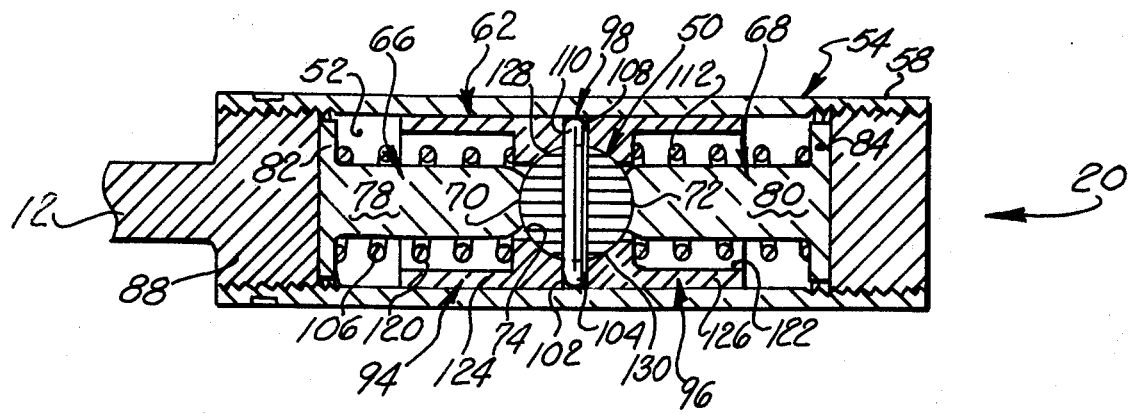
FIG. 2 is an enlarged sectional view, taken generally along line 2—2 of FIG. 1, illustrating the relationship between the various components of the ball and socket assembly when the steering system is in a straight ahead condition.
Figure 3:
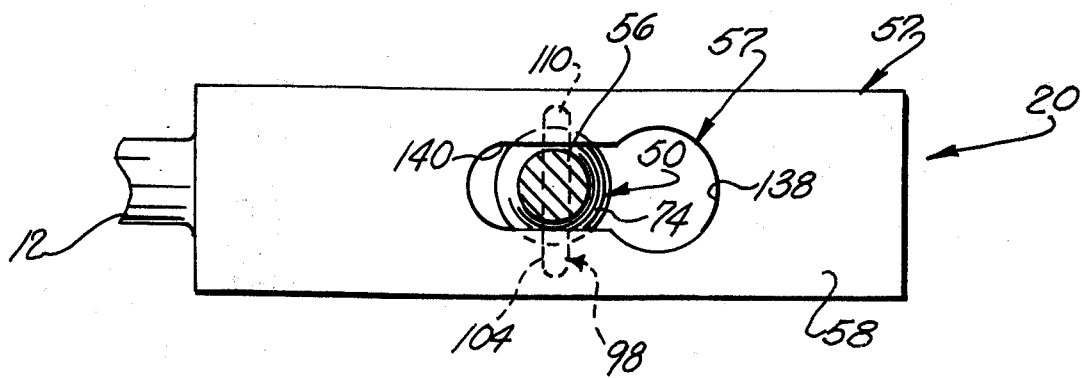
FIG. 3 is a plan view illustrating an opening through which a ball is inserted into a socket chamber and through which a shank portion extends into engagement with a part of the steering system.
Figure 4:
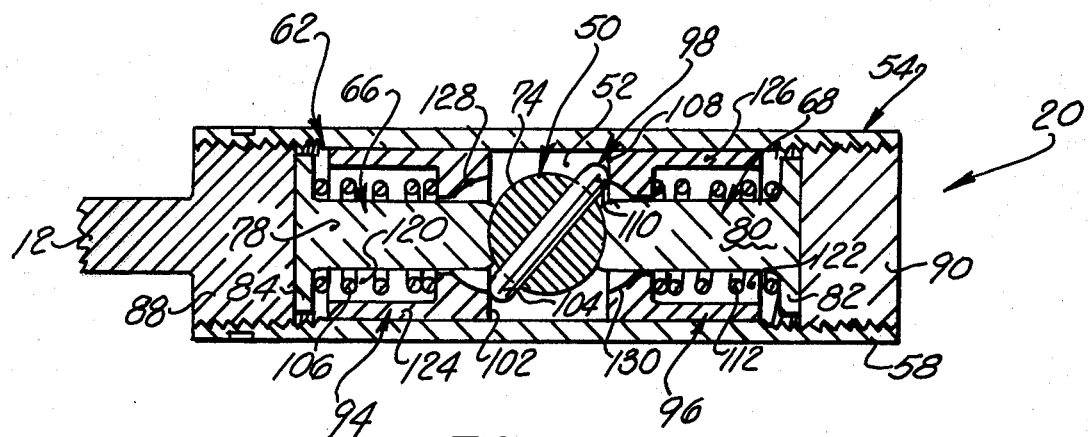
FIG. 4 is a sectional view, generally similar to FIG. 2, illustrating the relationship between the components of the ball and socket assembly when the steering system is in a turning condition.
Figure 5:
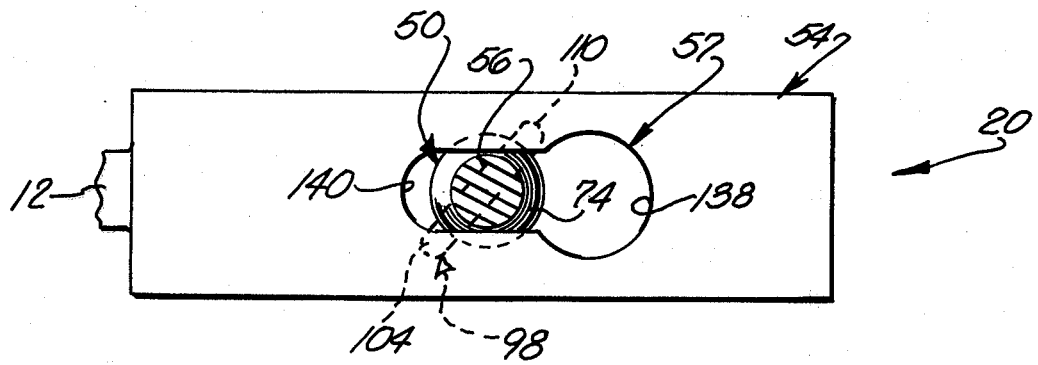
FIG. 5 is a plan view, generally similar to FIG. 3, illustrating the relationship between the ball and the opening in the socket wall when the vehicle is being turned.

Although the ball 50 has been illustrated in the drawings and described as turning in a clockwise direction from the initial position of FIG. 2 to the actuated position of FIG. 4, it should be understood that when the vehicle is being turned in the opposite direction the ball 50 rotates in a counterclockwise direction. When this occurs, the end portion 110 of the rod 98 is disposed in abutting engagement with the annular head end surface 102 of the sleeve 94 while the end portion 104 of the rod 98 is disposed in abutting engagement with the annular head end surface 108 of the sleeve 96. It should also be understood that although the ball joint 20 is illustrated as being between the pitman arm 16 and the center link 12, a ball joint of a construction similar to the construction of the ball joint 20 could be utilized at other locations in the steering linkage 10.

In view of the foregoing it can be seen that the ball and socket assembly 20 is advantageously utilized in the vehicle steering system 10 to promote a returning of the steering system to a straight ahead condition upon interruption of a steering operation. The assembly 20 includes the ball 50 which is rotated about the shank axis 116 in socket chamber 52 upon actuation of the steering system. In order to maintain the effective length of the various links in the steering system substantially constant upon actuation of the steering system, ball seats 66 and 68 support the ball 50 for rotation about its center which is maintained in a predetermined position in the socket chamber 52. As the ball 50 is rotated during a steering operation, a biasing assembly 62 is effective to apply a force to the ball tending to rotate it back to its initial position (FIG. 2) to thereby apply a force to the steering system tending to urge it toward a straight ahead condition.

The biasing assembly 62 includes a rod 98 which extends through the center of the ball 50 and is engaged by a pair of force transmitting members or sleeves 94 and 96 which are pressed against opposite ends 104 and 110 of the rod 98 by springs 106 and 112. Upon rotation of the ball 50, the opposite ends 104 and 110 of the rod 98 move the force transmitting members 94 and 96 apart (see FIG. 4) to thereby compress the springs. The compressed springs 106 and 112 press the sleeves 94 and 96 against opposite ends 104 and 110 of the rod 98 to apply a torque to the ball 50 which tends to rotate the ball back to its initial position. The compact construction of the ball and socket assembly 20 is promoted by mounting the sleeves 94 and 96 and springs 106 and 112 in coaxial relationship with each other and the ball seat members 66 and 68.

Having described one specific preferred embodiment of the invention, the following is claimed:

1. A ball and socket assembly for interconnecting parts of a vehicle steering system and for applying a force to the steering system tending to return it to a straight ahead condition upon actuation of the steering system to a turning condition, said ball and socket assembly including socket wall means for defining a socket chamber and adapted to be connected with a first part of the steering system, ball means disposed within said socket chamber and having an outer surface defining at least a portion of a sphere, shank means connected with said ball means and extending out of said socket chamber, said shank means having an outer end portion which is adapted to be connected with a second part of the steering system, ball seat means fixedly connected with said socket wall means and engaging opposite side portions of the spherical outer surface of said ball means for continuously retaining said ball means in said socket chamber with the center of said ball means in a predetermined position while enabling said ball means to rotate relative to said socket wall means about a central axis of said shank means from an initial position to an actuated position upon actuation of the steering system from the straight ahead condition to the turning condition, and biasing means for applying a force to said ball means tending to rotate said ball means relative to said socket wall means about the central axis of said shank means from the actuated position toward the initial position to thereby apply a force to the steering system tending to urge the steering system from the turning condition toward the straight ahead condition.

2. A ball and socket assembly as set forth in claim 1 wherein said biasing means includes a rod element extending through the center of said ball means and projecting outwardly from diametrically opposite sides of the spherical outer surface of said ball means, and means for applying forces to opposite end portions of said rod element upon rotation of said ball means relative to said socket wall means.

3. A ball and socket assembly as set forth in claim 1 wherein said socket wall means includes a tubular wall having an opening through which said shank means extends, said ball means being disposed in said socket chamber with its center on the longitudinal central axis of said tubular wall, said ball seat means including a pair of seat elements disposed on opposite sides of said ball means in a coaxial relationship with said tubular wall.

4. A ball and socket assembly as set forth in claim 1 wherein said biasing means includes a pair of projections connected with said ball means, a pair of force transmitting members disposed on opposite sides of said ball means, a pair of spring members disposed on opposite sides of said ball means in engagement with said force transmitting members and being effective to press said force transmitting members against said projections upon rotation of said ball means from the initial position to an actuated position.

5. A ball and socket assembly as set forth in claim 1 wherein said ball means includes surface means disposed in said socket chamber for defining a projection which rotates with said ball means relative to said socket wall means about the central axis of said shank means upon actuation of the steering system from the straight ahead condition to the turning condition, said biasing means including a member disposed in said socket chamber and movable by said projection relative to said ball seat means from a first position in said socket chamber to a second position in said socket chamber upon rotation of said ball means from the initial position to the actuated position and resiliently compressible means for applying a force to said member urging said member from said second position toward said first position to apply a torque to said ball means tending to rotate said ball means relative to said socket wall means from the actuated position toward the initial position.

6. A ball and socket assembly as set forth in claim 5 wherein said member has an annular configuration and circumscribes at least a portion of said ball seat means.

7. A ball and socket assembly as set forth in claim 6 wherein said annular member has a central axis which is coincident with the center of said ball means, said annular member being movable along a linear path in a direction away from said ball means from the first position toward the second position by said projection upon rotation of said ball means from the initial position to the actuated position.

8. A ball and socket assembly as set forth in claim 7 wherein said resiliently compressible means includes a coil spring which circumscribes at least a portion of said ball seat means and is disposed in a coaxial relationship with said annular member.

9. A ball and socket assembly as set forth in claim 7 wherein said annular member includes annular surface means for engaging a portion of the spherical outer surface of said ball means when said ball means is in the initial position.

10. A ball and socket assembly as set forth in claim 1 wherein said ball seat means includes first and second longitudinally extending seat members disposed on opposite sides of said ball means in a coaxial relationship and having end portions which engage diametrically opposite portions of the spherical outer surface of said ball means to hold said ball means in said socket chamber.

11. A ball and socket assembly as set forth in claim 10 wherein said biasing means includes a first ring member which is disposed in a coaxial relationship with and circumscribes said first seat member, a second ring member which is disposed in a coaxial relationship with and circumscribes said second seat member, a first coil spring which is disposed in a coaxial relationship with said first seat member and which engages said first ring member to urge said first ring member toward said ball means when said ball means is in the actuated position, and a second coil spring which is disposed in a coaxial relationship with said second seat member and which engages said second ring member to urge said second ring member toward said ball means when said ball means is in the actuated position.

12. A ball and socket assembly as set forth in claim 11 further including a first projection extending outwardly from the spherical outer surface of said ball means, a second projection extending outwardly from the spherical outer surface of said ball means at a location diametrically opposite from said first projection, said first projection including first surface means for applying a force to said first ring member to move said first ring member relative to said first seat member against the influence of said first coil spring upon rotation of said ball means in a first direction from the initial position toward an actuated position and for applying a force to said second ring member to move said second ring member relative to said second seat member against the influence of said second coil spring upon rotation of said ball means in a second direction from the initial position toward an actuated position, said second projection including second surface means for applying a force to said second ring member to move said second ring member relative to said second seat member against the influence of said second coil spring upon rotation of said ball means in the first direction from the initial position toward an actuated position and for applying a force to said first ring member to move said first ring member relative to said first seat member against the influence of said first coil spring upon rotation of said ball means in the second direction from the initial position toward an actuated position.

13. An assembly comprising socket wall means for defining a socket chamber adapted to be connected with a first part of a steering system, ball means disposed within said socket chamber and having an outer surface defining at least a portion of a sphere, shank means connected with said ball means and extending out of said socket chamber, said shank means having an outer end portion which is adapted to be connected with a second part of a steering system, ball seat means for retaining said ball means in said socket chamber and for enabling said ball means to rotate relative to said socket wall means about a central axis of said shank means from a first position to a second position, a rod element extending through said ball means and having first and second end portions projecting outwardly from the outer surface of said ball means, and means for applying force to said first and second end portions of said rod element urging said ball means to rotate about the central axis of said shank means from the second position toward the first position upon rotation of said ball means from the first position to the second position.

14. An assembly as set forth in claim 15 wherein said rod element has a central axis which extends perpendicular to and intersects the central axis of said shank means.

15. An assembly as set forth in claim 13 wherein said means for applying force to said first and second end portions of said rod element includes first and second force transmitting members disposed in said socket chamber on opposite sides of said ball means, first and second spring members disposed in said socket chamber, said first spring member being effective to press said first force transmitting member against said first end portion of said rod element upon rotation of said ball means from said first position to said second position, said second spring member being effective to press said second force transmitting member against said second end portion of said rod element upon rotation of said ball means from said first position to said second position.

16. An assembly comprising socket wall means for defining a socket chamber adapted to be connected with a first part of a steering system, ball means disposed within said socket chamber and having an outer surface defining at least a portion of a sphere, shank means connected with said ball means and extending out of said socket chamber, said shank means having an outer end portion which is adapted to be connected with a second part of a steering system, ball seat means for retaining said ball means in said socket chamber and for enabling said ball means to rotate relative to said socket wall means about a central axis of said shank means from a first position to a second position, said ball seat means including first and second seat members disposed in said socket chamber on opposite sides of said ball means in a coaxial relationship and having outer surfaces which engage diametrically opposite portions of the spherical outer surface of said ball means, and means for applying a force to said ball means tending to rotate said ball means from the second position toward the first position, said means for applying a force to said ball means including first and second surface means connected with opposite sides of said ball means, a first force transmitting member circumscribing at least a portion of said first seat member, first spring means for pressing said first force transmitting member against said first surface means when said ball means is in said second position to thereby urge said ball means toward said first position, and second spring means for pressing said second force transmitting member against said second surface means when said ball means is in said second position to thereby urge said ball means toward said first position.

17. An assembly as set forth in claim 16 wherein said first and second spring means are effective to press said first and second force transmitting members into abutting engagement with the spherical outer surface of said ball means when said ball means is in the first position.

18. An assembly as set forth in claim 16 wherein said first spring means includes a first coil spring disposed in said socket chamber in a coaxial relationship with said first seat member, said second spring means including a second coil spring disposed in said socket chamber in a coaxial relationship with said second seat member and said first coil spring.

* * * * *